United States Patent [19]

King

[11] 4,083,928
[45] Apr. 11, 1978

[54] PRODUCTION OF ALUMINUM CHLORIDE

[75] Inventor: Larry K. King, Maryville, Tenn.

[73] Assignee: Aluminum Company of America, Pittsburgh, Pa.

[21] Appl. No.: 748,000

[22] Filed: Dec. 6, 1976

[51] Int. Cl.$^2$ .......................... C01F 7/58; C01F 7/60
[52] U.S. Cl. .................................. 423/136; 423/137; 423/495; 423/496
[58] Field of Search ............... 423/136, 137, 495, 496

[56] References Cited

U.S. PATENT DOCUMENTS

| | | | |
|---|---|---|---|
| 3,639,101 | 2/1972 | Washburn | 106/44 X |
| 3,679,444 | 7/1972 | Washburn | 106/69 X |
| 3,959,439 | 5/1976 | Pope | 423/495 |
| 4,021,529 | 5/1977 | Kuriakose | 423/325 |

Primary Examiner—Edward Stern
Attorney, Agent, or Firm—Andrew Alexander

[57] ABSTRACT

An improved process for the production of aluminum chloride from coked alumina and chlorine comprises providing a bed of coked alumina in a reaction vessel and introducing gaseous chlorine thereto in an amount sufficient to fluidize the bed, at least a portion of the vessel having a nitride-based refractory lining especially adjacent and bounding the lower part of the fluidized bed. Aluminum chloride formed is recovered as a gaseous effluent emmanating from the bed.

6 Claims, 1 Drawing Figure

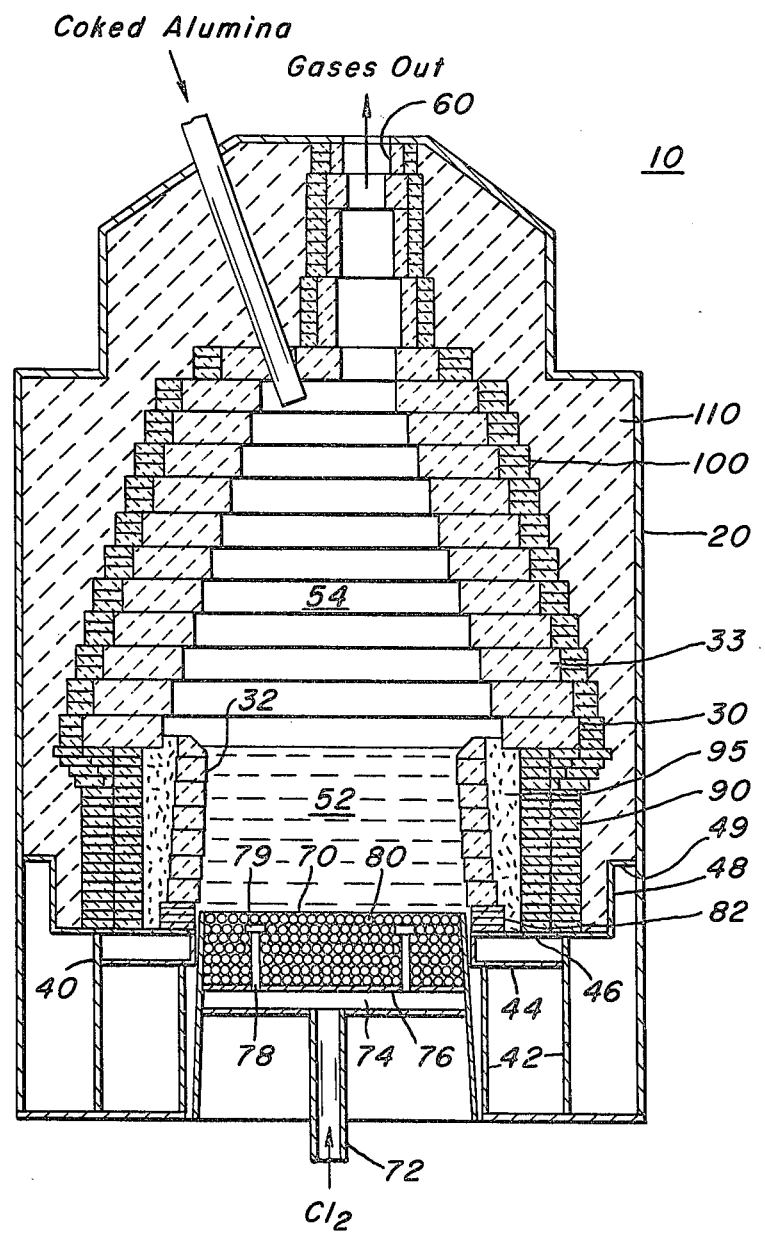

PRODUCTION OF ALUMINUM CHLORIDE

INTRODUCTION

This invention relates to the production of aluminum chloride and more particularly to a refractory material useful in a reaction vessel in the production of aluminum chloride.

The production of aluminum from the electrolysis of aluminum chloride has long been recognized. However, the commercialization of such process has been hampered by many problems, the solving or elimination of which can result in the economical production of aluminum. In the production of aluminum chloride for use in such process, severe degradation problems have been experienced in the lining materials used in a reaction vessel for the chlorination of coked alumina. A process for the chlorination of the coked alumina is disclosed in U.S. Pat. No. 3,842,163. In this patent the chlorination apparatus includes a fluidized bed reaction vessel wherein chlorine gas is introduced to a bed of carbon impregnated alumina in an amount sufficient to fluidize the bed and to react with coked or carbon impregnated alumina. The problems attendant the operating of such a vessel for production purposes include fabricating such vessel from materials which will withstand the highly corrosive environment for extended periods without need of repair. It will be appreciated that shutdown time for repairs interferes with productivity and the economic production of aluminum chloride.

Thus, the present invention includes an improvement in the construction of a reaction vessel suitable for the chlorination of alumina bearing materials in a fluidized bed. The invention virtually eliminates the decomposition of lining materials in the vessel whose destruction can result in the shutdown of the reaction vessel.

OBJECTS

One object of this invention is to provide an improved fluidized bed reaction chamber suitable for use in the production of aluminum chloride from chlorine and alumina in the presence of a reducing agent.

Other objects will become apparent from an examination of the drawing and a reading of the specification.

SUMMARY OF THE INVENTION

In accordance with the invention, an improved reaction vessel for the production of aluminum chloride by the reaction of a source of gaseous chlorine and an aluminous compound in the presence of a reducing agent is provided. In the vessel, a bed of the aluminous compound and the reducing agent is fluidized by the introduction of chlorine through a gas diffusing zone. The vessel is provided with a multilayer lining including a nitride-based refractory lining at least adjacent the gas diffusing zone. The aluminum chloride formed is recovered as a gaseous effluent emanating from the bed.

BRIEF DESCRIPTION OF THE DRAWING

FIG. 1 is a schematic vertical section view of a fluidized bed reaction chamber constructed in accordance with the invention.

DETAILED DESCRIPTION OF THE PREFERRED EMBODIMENTS

In the production of aluminum chloride in a reaction chamber, as shown in the FIGURE, wherein chlorine is introduced to a bed of alumina and carbon and the chlorination reaction is effected at a temperature in the range of 450° to 800° C, the present invention utilizes a nitride-based refractory material at selected locations within the reaction chamber. These selected locations include regions in the vessel where the temperature drops below about 450° C and which are subject to the highly corrosive reactants present in the production of aluminum chloride. Using the nitride-based refractory at such selected locations significantly increases the useful life of the reaction chamber.

The nitride-based material or refractory referred to includes both a refractory having a nitride base or a refractory having associated therewith a compound such as silicon oxide (silica), boron oxide, and aluminum oxide. Preferred materials using the nitride-based refractory in accordance with this invention include silicon oxynitride, silicon nitride bonded fused silica, aluminum nitride and boron nitride. Such silicon oxynitride is commercially available from Norton Company, Worcester, Massachusetts, and is referred to as SI-OXYN. It has the general formula $Si_2ON_2$.

In the production of the nitride-based material, it is preferred to select a green binder which leaves substantially no carbonaceous residue, e.g. carbide, or compounds on firing the refractory because such residues can lead to decomposition of the refractory in highly corrosive evironments. Thus, in the production of silicon oxynitride refractory from silica, silicon and nitrogen, the use of an acrylic resin binder such as methacrylate, ethacrylate, butylacrylate or methylmethacrylate, ethylmethacrylate and butylmethacrylate, results in the absence of harmful amounts of carbonaceous residue or compounds, e.g. silicon carbide, on firing. The absence of such carbonaceous residues significantly increases the refractory's resistance to attack by reactants such as those present in the production of aluminum chloride.

With respect to materials useful in the production of aluminum chloride, the present invention includes within its purview the use of aluminous compounds derived from, for example, clays, bauxite, anorthosite, red mud, feldspar, oil or coal shale, as well as purified forms of alumina such as that extracted from its ore by the well known Bayer Process. Also, chlorine sources useful in the process include gaseous chlorine, carbon tetrachloride and phosgene, for example. The source of carbon can be any carbonaceous material including carbon tetrachloride, phosgene, carbon monoxide and the like.

Referring to the drawing, there is illustrated a fluidized bed reaction chamber 10 for the chlorination of alumina or alumina bearing material in the presence of a reducing agent. The chamber has an external metal shell 20, a multilayer lining referred to generally as 30 and a support structure 40 on which the multilayer lining rests. The multilayer lining defines a generally cylindrical shaped reaction zone having a bottom portion 52 for containing the fluidized bed and a top portion 54 through which gaseous effluent emmanating from the fluidized bed passes as it is removed through outlet 60.

Support structure 40 comprises leg members 42 which are adapted to be mounted on a more or less planar base. Legs 42 provide support for annular or ring-like member 44 and are fastened thereto. Annular member 44 supports a generally circular plate 46 which provides a base for multilayer lining 30. In the FIGURE, plate 46 is shown having a cylindrical wall 48 therein with a flange 49 extending from wall 48 to metal shell 20. However, plate 46 which provides a base for multilayer lining 30 may be extended directly to metal shell 20.

The fluidized bed has a bottom which comprises a gas diffusing zone or distribution inlet assembly, generally designated 70, for effecting controlled introduction of chlorine gas thereinto. Chlorine gas is supplied to gas distribution inlet assembly 70 through conduit 72 to gas plenum 74. Gas distribution assembly 70 comprises a plate 76 and nozzles 78, preferably surmounted by bubble caps 79, mounted on plate 76 to pass gas from plenum 74 to the reaction chamber. To aid in diffusion of the gas as it is introduced to the reaction chamber, a bed of loosely packed refractory spheres 80 are supported by plate 76 and are provided about nozzles 78.

Multilayer lining 30, referred to hereinabove, comprises an inner course or layer 32 of stacked blocks which are essentially inert to reactants at the operating temperatures of the reaction chamber, e.g. in the temperature range of 450° to 800° C. By reference to the FIGURE, it can be seen that inner layer 32 extends essentially continuously from plate 46 to outlet 60. Preferably inner layer 32 in upper portion 54 and in lower portion 52 is formed from baked carbon, the preparation of which is described in U.S. Pat. No. 3,959,439 incorporated herein by reference. Further, in accordance with the present invention, inner layer 32, substantially adjacent loosely packed bed 80 of refractory spheres, is constructed from the nitride-based refractory, referred to hereinabove. That is, carbon can be used for inner layer 32 which is subjected to high temperatures generated during the exothermic chlorination reaction. Carbon has been found to withstand the corrosive atmosphere of the reactor at the chlorination reaction temperatures, e.g. from 450° to 800° C. However, for reasons not fully understood, when the temperature drops below that of the reaction, carbon decomposes rapidly necessitating frequent shutdown of the reactor for repair. One area in which carbon decomposition occurs includes region 82 adjacent bed 80 of refractory spheres. Region 82 is cooled below the reaction temperature range by entering chlorine gas and thus loses corrosion resistance, resulting in its deterioration at an alarming rate. This behavior of carbon or graphite has been encountered in other areas where $AlCl_3$ is present. For example, Grothe, in Electrolysis of Aluminum Chloride, Erzbergbau und Metallhuttenwesen 3 (1950), at page 9, notes, with respect to graphite anodes, that the graphite anodes are not destroyed when electrolysis is carried out at rather high temperatures--at least 450° C. It was also noted that the destruction was observed only when the melt contained $AlCl_3$, $FeCl_3$ or $BiCl_3$. Thus, it can be appreciated that the resolution of such problems in vessels for the production of aluminum chloride can be economically beneficial in aluminum production. Thus, in accordance with one aspect of the present invention, region 82 of inner layer 32 adjacent the fluidized bed is lined with the nitride-based refractory in the regions where the temperature of inner layer 32 drops below the reaction temperature.

In bottom portion 52 of the reaction chamber disposed between inner layer 32 and metal shell 20 is a course or wall of refractory material 90 suitably constructed from firebrick which acts, in one important function, to provide support for the multilayered lining 30 in top portion 54 of the reaction chamber. Course 90 as well as providing support also provides insulative value. Firebrick suitable for this application are available from A. P. Green Refractories Co., Tarentum, Pennsylvania under the designation KX-99.

In bottom portion 52 of the reaction chamber intermediate layer 32 and course 90 is provided a layer of finely divided particulate material 95 substantially inert to reactive gases penetrating or permeating inner layer 32. Particulate material 95 is compacted to a degree which provides high resistance to passage of gaseous material therethrough. Preferably, the particle material is alumina which has a size of −325 mesh (U.S. Series) and which is compacted to provide a bulk density of at least 120 lbs. per cubic foot and preferably 140 lbs. per cubic foot. Particulate material 95 by providing high resistance to penetration by gaseous material provides protection for course 90 against attack by gases such as chlorine, which attack would deteriorate and weaken the entire multilayer lining structure.

In upper portion 54 of the reaction chamber carbon block 33 constituting inner layer 32 are carried or supported by course 90. Carbon blocks 33 can be more massive, as shown in the FIGURE, than those provided in lower portion 52 of the reaction chamber. Also, it will be observed that in one embodiment, as shown in the FIGURE, blocks 33 can be placed so as to provide a generally conical shaped upper portion 54.

In the upper portion 54, a course or wall of refractory material 100, suitably formed from insulating brick, is disposed adjacent and intermediate inner layer 32 and metal shell 20. In addition, disposed intermediate insulating brick 100 and metal shell 20 is a particulate insulative refractory material 110. It will be noted from the FIGURE that particulate, insulative refractory material 110 extends from outlet 60 to plate 46 and substantially fills the space between the metal shell and insulating brick 100. In the upper portion 54, course or refractory wall 100 provides both structural integrity and controlled insulative value to the multilayered lining. In addition, refractory wall 100 should be substantially inert to gaseous effluent which may permeate blocks 32. It should be understood that due to the temperatures and corrosiveness, blocks 32 can develop cracks which extend to refractory wall 100. Thus, the insulating brick serve to prevent gaseous effluent from reaching and attacking particulate insulative layer 110. In addition, refractory wall 100 prevents particulate in insulative layer 110 from passing through cracks in the carbon blocks and contamination of the aluminum chloride produced in the fluidized bed.

Insulating brick employed in refractory wall 100 should have a high insulative value and a high alumina content, particularly when used in the layer immediately adjacent carbon blocks 32 since such application requires that the brick should be reaction inert with respect to gaseous effluent which may permeate or penetrate the carbon blocks. Also, having a high insulative value serves to conserve energy which may have to be supplied to the reaction chamber. In addition, having a high insulative value permits the use of a less costly brick, e.g. alumina-silica type brick, in additional courses of brick (not shown) which may be desired before providing particulate insulative refractory 110. A high alumina brick which has been found suitable for application adjacent the carbon blocks may be obtained from Norton Company, Worcester, Massachusetts under the designation AN599. Alumina-silica brick which can find application between the high alumina brick and particulate insulative refractory can be obtained from Johns-Manville, Denver, Colorado under the designation JM23 firebrick.

With respect to particulate insulative refractory 110, it preferably comprises expanded perlite which provides low cost insulation. Expanded perlite, as referred to herein, is used to denote perlite which when subjected to heat expands to form a lightweight aggregate. The particulate insulative refractory should have a mesh size of +20 (Tyler Series) and preferably +6 (Tyler Series).

Having a reaction chamber constructed incorporating the features outlined above results in the useful life of the chamber being extended rather significantly. That is, providing a multilayer lining employing materials or refractories at selected locations, as indicated hereinabove, can ensure continued use of the reaction chamber with only minimal maintenance costs.

It will be appreciated that the instant specification and drawing are set forth by way of illustration and not limitation, and that various modifications and changes may be made without departing from the spirit and scope of the present invention.

What is claimed is:

1. In an improved process for the production of aluminum chloride by the reaction of a source of gaseous chlorine and an aluminous compound in the presence of a reducing agent in a reaction chamber, the improvement comprising:
   (a) providing a gaseous diffusing zone in the reaction chamber, the chamber having an outer metal shell, an outlet and a multilayer lining therein, the lining having
      (i) an inner layer at least adjacent the diffusing zone formed from a nitride-based refractory characterized by being essentially free of carbonaceous residue and being resistant to attack by reactants in the chamber at temperatures below 450° C;
   (b) maintaining a fluidized bed containing the aluminous compound and the reducing agent above the diffusing zone, and adding gaseous chlorine to the reaction chamber through the diffusing zone to the fluidized bed to form aluminum chloride, the multilayer lining having
      (i) an inner layer adjacent the fluidized bed and extending to said outlet formed from carbon, the multilayer lining further including
      (ii) a wall of refractory material perimetrically bounding the inner layer of carbon,
      (iii) adjacent the diffusing zone and the fluidized bed, a first layer of finely divided particulate material intermediate the inner layer and the wall of refractory material, said particulate material being reactioninert to gaseous meterial penetrating the inner layer;
      (iv) a second layer of insulative refractory particles intermediate the wall of refractory material and the metal shell; and
   (c) recovering the aluminum chloride formed as gaseous effluent emmanating from the fluidized bed.

2. The method according to claim 1 wherein the nitride-based refractory employed is one selected from the group consisting of silicon oxynitride, silicon nitride bonded fused silica, silicon nitride and boron nitride.

3. The method according to claim 1 wherein the nitride-based refractory employed in the lining is silicon oxynitride.

4. The method according to claim 1 wherein the particulate material is alumina.

5. In an improved process for the production of aluminum chloride by the reaction of a source of gaseous chlorine and an aluminous compound in the presence of a reducing agent in a reaction chamber, the improvement comprising:
   (a) providing a gaseous diffusing zone in the reaction chamber, the chamber having an outer metal shell, an outlet and a multilayer lining therein, the lining having
      (i) an inner layer at least adjacent the diffusing zone formed from silicon oxynitride characterized by being essentially free of carbonaceous residue and being resistant to attack by reactants in the chamber at temperatures below 450° C;
   (b) maintaining a fluidized bed containing the aluminous compound and the reducing agent above the diffusing zone, and adding gaseous chlorine to the reaction chamber through the diffusing zone to the fluidized bed to form aluminum chloride, the multilayer lining having
      (i) an inner layer adjacent the fluidized bed and extending to said outlet formed from carbon, the multilayer lining further including
      (ii) a wall of refractory material perimetrically bounding the inner layer of carbon,
      (iii) adjacent the diffusing zone and the fluidized bed, a first layer of particulate alumina intermediate the inner layer and the wall of refractory material, said particulate material being reaction-inert to gaseous material penetrating the inner layer and having a mesh size of −325 (U.S. Series) and a bulk density of 120 lbs. per cubic foot, and
      (iv) a second layer of expanded perlite employed intermediate the wall of refractory material and the metal shell; and
   (c) recovering aluminum chloride formed as gaseous effluent emmanating from the fluidized bed.

6. The method according to claim 1 wherein the insulative refractory particles in said second layer are expanded perlite.

* * * * *